US011979389B1

(12) United States Patent
John Thomas et al.

(10) Patent No.: US 11,979,389 B1
(45) Date of Patent: May 7, 2024

(54) END-TO-END MESSAGE ENCRYPTION

(71) Applicant: Syniverse Technologies, LLC, Tampa, FL (US)

(72) Inventors: Rajan John Thomas, Sanford, FL (US); Chris Wright, Plant City, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 18/334,047

(22) Filed: Jun. 13, 2023

Related U.S. Application Data

(60) Provisional application No. 63/393,603, filed on Jul. 29, 2022.

(51) Int. Cl.
| | |
|---|---|
| *G06F 7/04* | (2006.01) |
| *G06F 15/16* | (2006.01) |
| *H04L 9/40* | (2022.01) |
| *H04L 29/06* | (2006.01) |
| *H04W 12/03* | (2021.01) |

(52) U.S. Cl.
CPC .......... *H04L 63/067* (2013.01); *H04L 63/166* (2013.01); *H04W 12/03* (2021.01)

(58) Field of Classification Search
CPC ............................ H04L 63/067; H04L 63/166
USPC .......................................................... 726/7
See application file for complete search history.

(56) References Cited

U.S. PATENT DOCUMENTS

| | | | | |
|---|---|---|---|---|
| 8,837,739 | B1* | 9/2014 | Sexton ................ | H04L 63/0464 380/278 |
| 2003/0231651 | A1* | 12/2003 | Sprague ............... | H04Q 3/0029 370/467 |
| 2019/0261169 | A1* | 8/2019 | Kamal ................ | H04L 63/0815 |
| 2020/0220713 | A1* | 7/2020 | Li ............................. | H04L 9/14 |
| 2021/0314143 | A1* | 10/2021 | Conner ................ | H04L 63/067 |
| 2022/0094554 | A1* | 3/2022 | Sekar .................... | H04L 9/0825 |

* cited by examiner

*Primary Examiner* — Jeffrey C Pwu
*Assistant Examiner* — Samuel Ambaye
(74) *Attorney, Agent, or Firm* — Anton J. Hopen; Smith & Hopen, P.A.

(57) ABSTRACT

This invention provides a method and system for secure messaging on a mobile network, leveraging public/private key encryption. The method includes steps for deploying a trusted application by a mobile carrier on a device with a Trusted Execution Environment (TEE). A wireless Software Development Kit (SDK) on the subscriber device interacts with the trusted application and a wireless original equipment manufacturer (OEM) cloud service for mutual attestation, confirming the identity and trustworthiness of the device. A pair of public and private keys are generated, with the private key secured on the device. Messages are encrypted with the public key at a cloud messaging application, and decrypted with the private key at the device, enabling secure, viewable messages. The system can support secure transmission of one-time-passwords (OTPs) from an enterprise application, as well as encrypted chat functionality for device responses to the enterprise application.

6 Claims, 5 Drawing Sheets

END-TO-END MESSAGE ENCRYPTION

PRIORITY CLAIM

This application claims priority to U.S. Provisional Patent No. 63/393,603 filed Jul. 29, 2022, entitled "End to End Message Encryption."

BACKGROUND OF THE INVENTION

1. Field of the Invention

The present invention pertains to the field of telecommunications and data security, specifically to a system and method for secure transmission and encryption of messages, such as One-Time Passwords (OTP), delivered via the Signaling System No 7 (SS7) protocol and/or Rich Communication Services and decrypted in a trusted execution environment (TEE) on a mobile device.

2. Brief Description of the Related Art

Short messaging service (SMS) messaging on mobile phone networks around the world are connected to each other through the SS7 protocol. They are often used in 2-factor authentication, not because SMS is particularly secure but because it is ubiquitous. SMS messages are not encrypted and can be intercepted which is why over the top (OTT) applications like TELEGRAM and SIGNAL claim end-to-end security. RCS is a communication protocol between mobile-telephone carriers and between phones and carriers. The aim of RCS is to replace SMS messaging with a system that can support voice, video, text, and multimedia communications, offering a more dynamic and flexible communication method. RCS is specified by the GSMA (Groupe Spéciale Mobile Association), a trade body that represents the interests of mobile network operators worldwide. What is needed in the art is a method to provide encryption to traditional SS7 and RCS messaging.

SUMMARY OF THE INVENTION

The present invention uses a public/private key encryption to receive secure messaging on a mobile network. The steps for provisioning this message encryption include providing a trusted application (e.g., by a mobile phone carrier) on subscriber device operating a trusted execution environment (TEE). Sending from the trusted application an identity request to a wireless device SDK operating on the subscriber device, the SDK providing an identity response to the trusted application. The trusted application generates a private/public key pair and stores the private key to a secure store on the subscriber device. The trusted application uses the generated public key with the device identity to create an encrypted and signed binary large object (blob), which is provided to the OEM Cloud Service for establishing device as trustworthy and to get the public key for the messaging service. The public key obtained by the cloud messaging application whereby messages addressed to the subscriber device that would otherwise be delivered unencrypted are encrypted with the public key at the cloud messaging application. The encrypted message then passes from the cloud messaging application, through a message gateway and is delivered to the subscriber device. The message is then decrypted with the private key resident on the subscriber device and the unencrypted message is viewable by an end user of the subscriber device.

While the specific information hard-coded into the TEE may vary between manufacturers and devices, it generally includes:

a. Device-specific cryptographic keys: These unique keys are used for encryption, decryption, and authentication purposes. They are essential for secure communication between the device and external services, as well as for verifying the integrity of the device and its software.

b. Hardware and firmware unique identifiers: These identifiers are used to uniquely identify the device and its components. They can be used for various purposes, such as device registration, licensing, or tracking.

c. Security mechanisms and algorithms: These may include cryptographic algorithms, random number generators, and other security-related functions that are necessary for secure operation.

d. Secure boot process: The TEE may contain a secure boot process that verifies the integrity of the operating system and other critical software components before they are executed. This helps protect the device from unauthorized modifications and malware.

e. Secure storage: The TEE may provide a secure storage area for sensitive data, such as cryptographic keys, certificates, and other security-related information.

A processor manufacturer can validate whether a TEE on a device is valid. The manufacturer has detailed knowledge about the design, architecture, and implementation of the TEE, as well as access to the unique hardware identifiers and cryptographic keys that are embedded within the device during production. To validate the TEE, the manufacturer can use a process called attestation. Attestation is a mechanism through which a device can provide evidence of its hardware and software configuration and prove its identity to a remote party, such as the manufacturer or a service provider. This evidence, in the form of an attestation report, includes the device's unique identifiers, hardware configuration, and other relevant information, and is signed with the device's private attestation key. The processor manufacturer, having access to the public attestation key corresponding to the device's private attestation key, can verify the signature on the attestation report. This process ensures that the attestation report is genuine and originates from a valid TEE on the device.

Attestation of a mobile device's Trusted Execution Environment (TEE) can be done through an API provided by the processor manufacturer or a trusted third-party service. These APIs enable communication between the device and the manufacturer's attestation service, allowing the device to send attestation (identity and validation) reports and the manufacturer to verify their authenticity. Typically, the attestation process involves the following steps:

a. The mobile device generates an attestation report containing information about the device's hardware and software configuration, and signs it with the device's private attestation key. In an embodiment of the present invention, an enterprise application running on the subscriber device uses a software component or SDK provided by the processor manufacturer to access the TEE.

b. The device sends the attestation report to the manufacturer's attestation service through the API.

c. The manufacturer's attestation service verifies the signature on the attestation report using the corresponding device's hardware public attestation key.

d. If the signature and the contents are valid, the attestation service returns the data packaged by the device inside the report as a response.

By using an API, the attestation process can be automated and seamlessly integrated into applications and services that require validation of a device's TEE. This ensures secure communication and trust between the mobile device and the services that rely on the TEE's integrity.

An embodiment of the invention for delivering an encrypted message may originate at an enterprise application. For example, a one-time-password (OTP) may be generated for authentication to a banking or healthcare application. The security of the OTP is important for financial and HIPAA purposes. The enterprise application establishes a secure HTTPS connection to a cloud messaging application. The cloud messaging application oversees delivering this OTP to a subscriber device. This may be through a messaging gateway such as SMS, MMS and RCS, but the process is applicable to other message infrastructures. Instead of just sending the OTP as unencrypted plaintext or Unicode the cloud messaging application has the public key of the destination subscriber device. The public key is used to "lock" or encrypt the OTP message and only the private key accessible in a key vault of the TEE of the subscriber device can decrypt the OTP message. Accordingly, the OTP message can now be transmitted securely through the messaging gateway to the subscriber device.

It should be noted that in an alternative embodiment of the invention where the subscriber device seeks chat functionality to respond to the enterprise application (person-to-application or P2A) another key pair is generated in the opposite direction. In other words, a public key for the P2A communication is stored on the device and the cloud messaging service stores a private key for the device. The device encrypts the outbound P2A message with the P2A public key and the cloud messaging service decrypts the message with the corresponding P2A private key for that device.

In one embodiment, the public and private keys are generated on the subscriber device using an advanced encryption algorithm to further secure the communication process. This encryption algorithm can include algorithms such as RSA, DSA, ECC, or others suitable for the creation of secure key pairs.

In another embodiment, the trusted application might utilize multi-factor authentication to validate the user of the subscriber device before starting the attestation process. This could include password, fingerprint, facial recognition, or other biometric measures to enhance the overall security of the system.

In yet another embodiment, the cloud messaging service may be equipped with a mechanism to validate the integrity of the public key received from the subscriber device. This might involve the use of digital signatures or checksums to ensure that the public key has not been tampered with during transmission.

In a different embodiment, the enterprise service could be configured to generate OTPs that expire after a certain period or after they have been used. This would help to maintain the security of the system even if an OTP were intercepted.

In yet another embodiment, the system might include a secure log mechanism that records the transactions and attempted breaches of the communication system. These logs could be used for auditing, troubleshooting, or to identify patterns of attempted security breaches.

In yet another embodiment, the system can use the Key Derivation function to derive keys based on public key generated on the device and the cloud to come up with a symmetric key which can be used for encryption/decryption rather than the public and private key itself.

Finally, in another embodiment, the secure messaging method could be extended beyond SS7 protocol messaging to encompass other communication protocols, making the method more versatile for different network environments.

An exemplary process according to an embodiment of the invention may include the following:

a. Start of the Process: A user makes a request to an enterprise application (e.g., a banking app) which necessitates the generation of a One-Time Password (OTP).

b. OTP Generation and Transmission: The enterprise application generates an OTP for the user. This OTP is then sent securely via a Hypertext Transfer Protocol Secure (HTTPS) connection to a cloud messaging service.

c. Public Key Usage: The cloud messaging service, having previously received and stored the public key of the user's device, uses this key to encrypt the OTP.

d. Message Routing: The encrypted OTP is then transmitted to a Short Messaging Service (SMS) gateway using the short message peer-to-peer protocol.

e. Delivery to User's Device: The SMS gateway delivers the encrypted message to the user's mobile device via the Signaling System No 7 (SS7) protocol.

f. Message Decryption: The mobile device, running in a trusted execution environment (TEE) and housing the corresponding private key, decrypts the OTP message.

g. OTP Display: Once decrypted, the OTP is displayed on the user's device, where it can be used for the authentication process on the enterprise application.

This process ensures that the OTP, although sent via SMS, is securely encrypted for the entire duration of the transit until it reaches the user's mobile device, where it is safely decrypted for use. The user can then use this OTP to authenticate themselves on the enterprise application.

BRIEF DESCRIPTION OF THE DRAWINGS

For a fuller understanding of the invention, reference should be made to the following detailed disclosure, taken in connection with the accompanying drawings, in which.

DETAILED DESCRIPTION

In the following detailed description of the preferred embodiment, reference is made to the accompanying drawings, which form a part hereof, and within which specific embodiments are shown by way of illustration by which the invention may be practiced. It is to be understood that other embodiments may be utilized, and changes may be made without departing from the scope of the invention.

Figure 1:
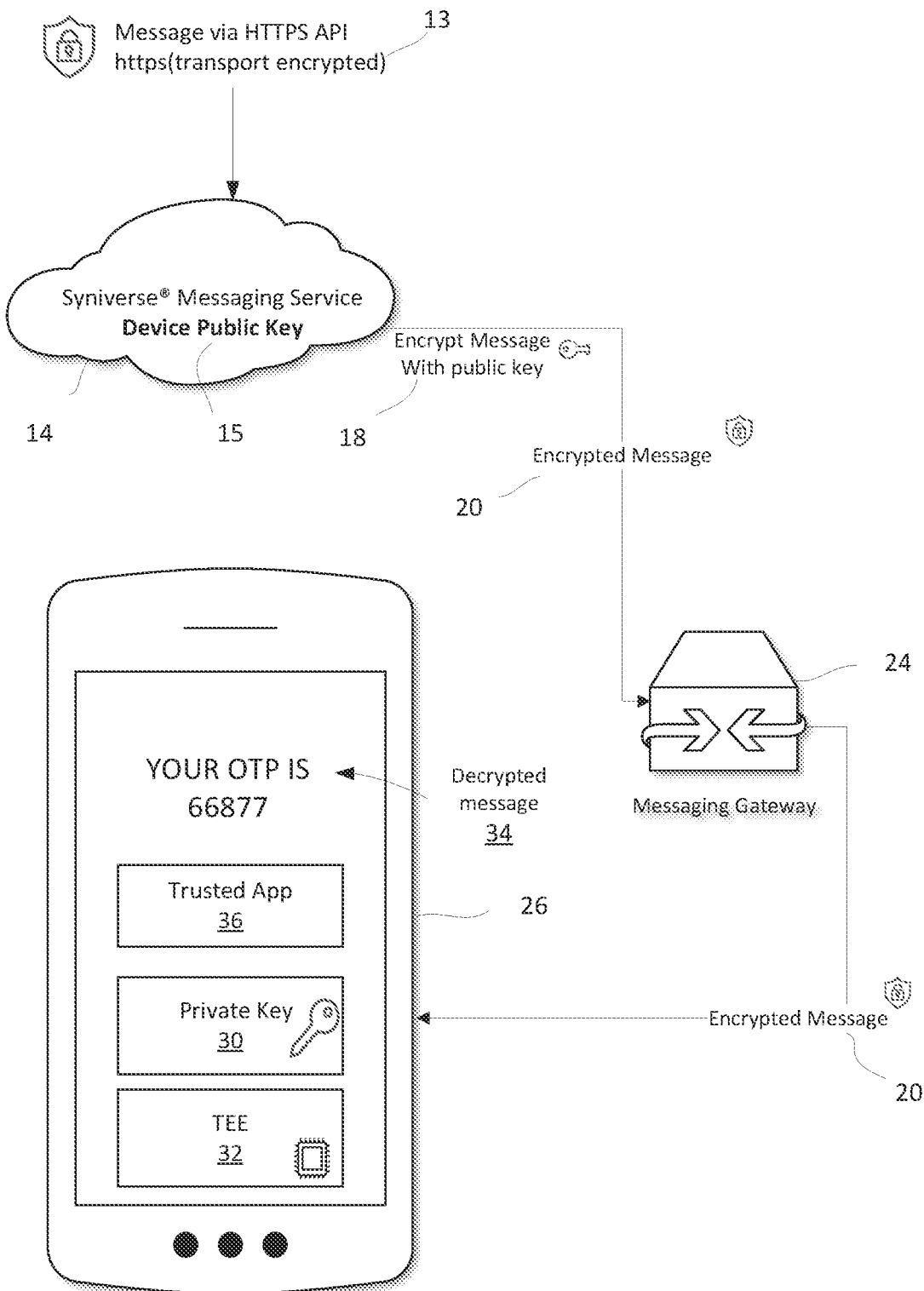
FIG. 1 is a diagrammatic view of an embodiment of the invention for securing an OTP.

FIG. 1 provides a schematic depiction of an embodiment of the invention. An enterprise service wants to send sensitive information to a subscriber device 26. This could be a PIN, password, financial statement, healthcare diagnosis or the like. The message is received at a messaging service through HTTPS API 13. Accordingly, the first leg of the journey is, in fact, secure. However, traditionally the path from the messaging service through the messaging gateway 24 and to the subscriber device 26 has been unencrypted. This has been an ongoing concern for secure messaging applications. The current invention provides both device attestation (to ensure the subscriber device is trustworthy) and a public/private key cryptography framework. Such asymmetrical cryptography puts a high security value on the private key 30. Accordingly, this invention keeps the private key 30 for the subscriber device 26 stored in the trusted execution environment (TEE) 32 of the device 26. When device 26 is provisioned for secure messaging only the public key 15 is shared with the messaging service 14. Public key 15 is necessary to encrypt the message 18, but it cannot decrypt it. Only the private key 30 can decrypt the message, the private key 30 resident on the subscriber device 26. Thus, the messaging service 14 that receives the enterprise application message 13 has the public key 15 for the destination subscriber device 26 and secures the message 18 prior to transport through the messaging gateway 24.

Figure 2:
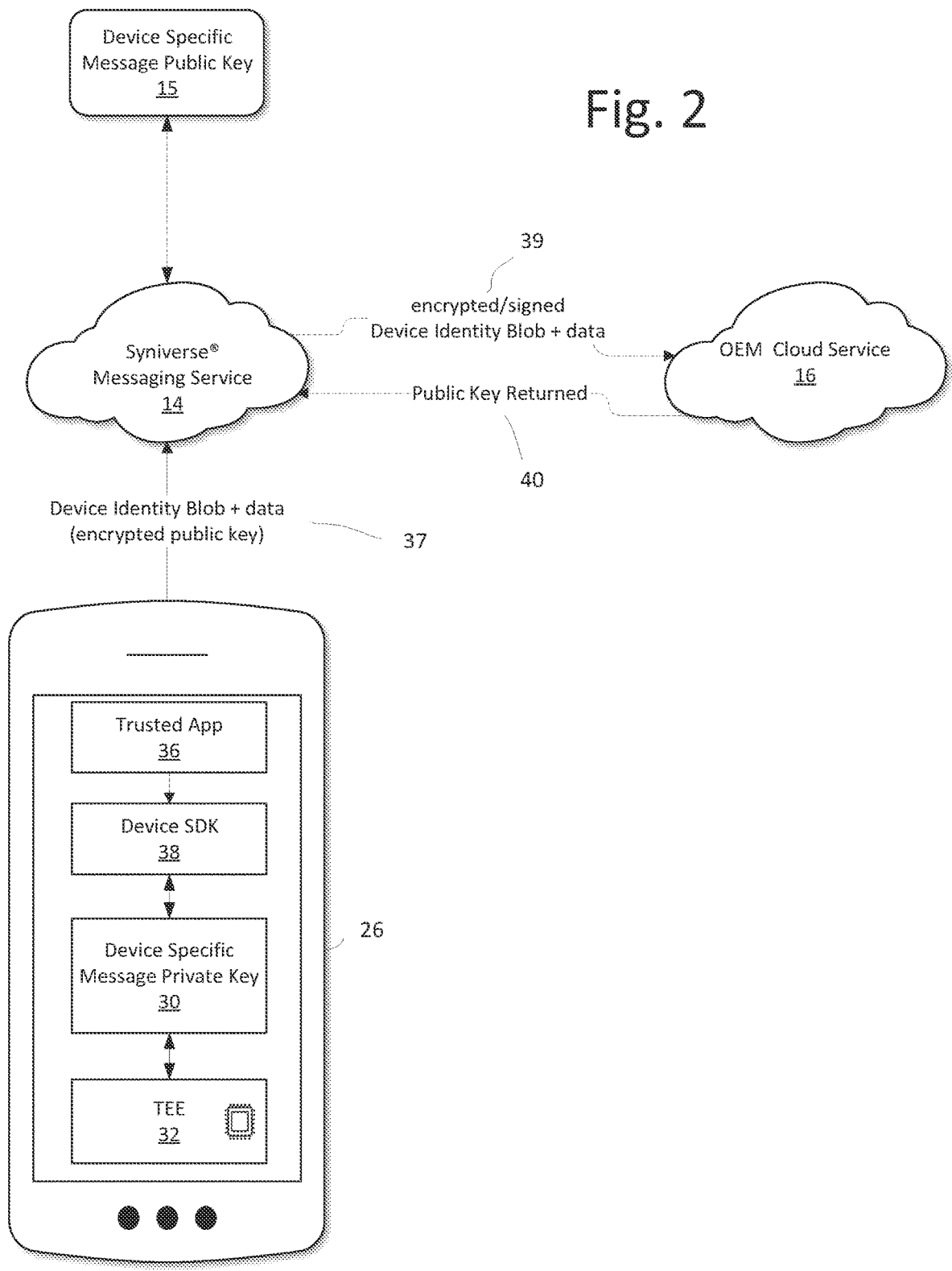
FIG. 2 is a diagrammatic view of an embodiment of the invention provisioning the public/private keys for a subscriber device.

FIG. 2 is a high-level diagram of the provisioning process according to an embodiment of the invention. On the device, a trusted application 36 communicates with a Device SDK 38 which gives access to the TEE 32 wherein the device private key 30 is stored. As part of initialization, the device 26 generates the public/private key and sends the proper identity and data as validation request to get the public key 40 but only shares the public key 15 with the messaging service 14. The messaging service 14 now can associate a device-specific message public key 15 with the subscriber device 26 and encrypt messages bound for that device. The private key 30 is secured on device 26 which is the endpoint in the process before the otherwise encrypted message can be read.

Figure 3:
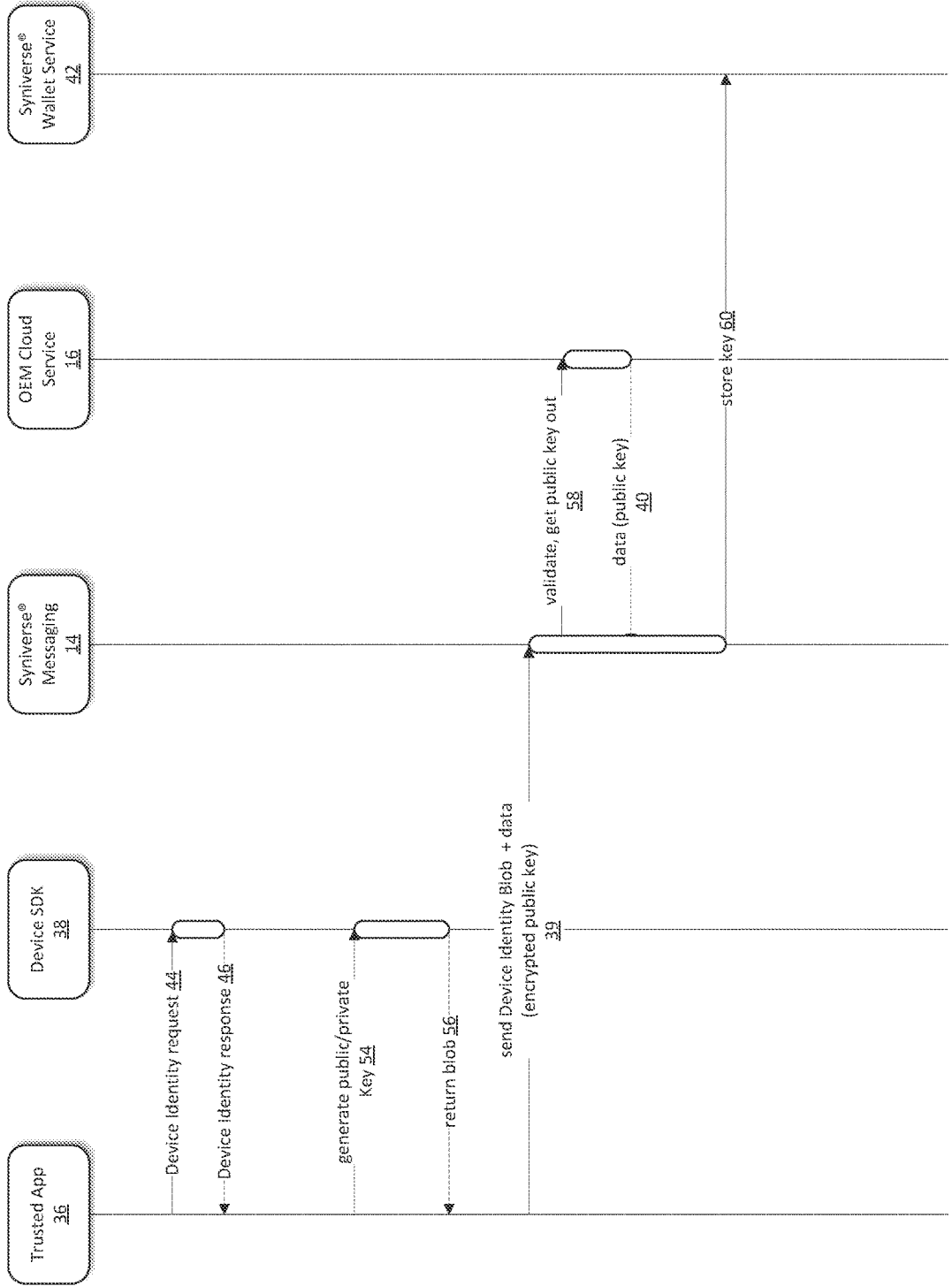
FIG. 3 is a call flow diagram of an embodiment of the invention for provisioning the public/private keys for a subscriber device.

In FIG. 3 the call flow for provisioning starts with the trusted application 36 that makes an identity request by sending device identity request 44 to the Device SDK 38 which returns an attestation response 46 verifying the device identity. Trusted application 36 generates a public/private key set 54 which is securely stored in a key vault in the TEE of the device. However, no encryption can take place without sharing the public key 15. Accordingly, the public key 15 is shared 39 with the cloud messaging application 14 and is stored 60 in a cloud wallet service 42. The cloud messaging application 14 now has access to the public key 15 for the subscriber device 26 running the trusted application 36 and thus can start encrypting message bound for the device 26.

Figure 4:
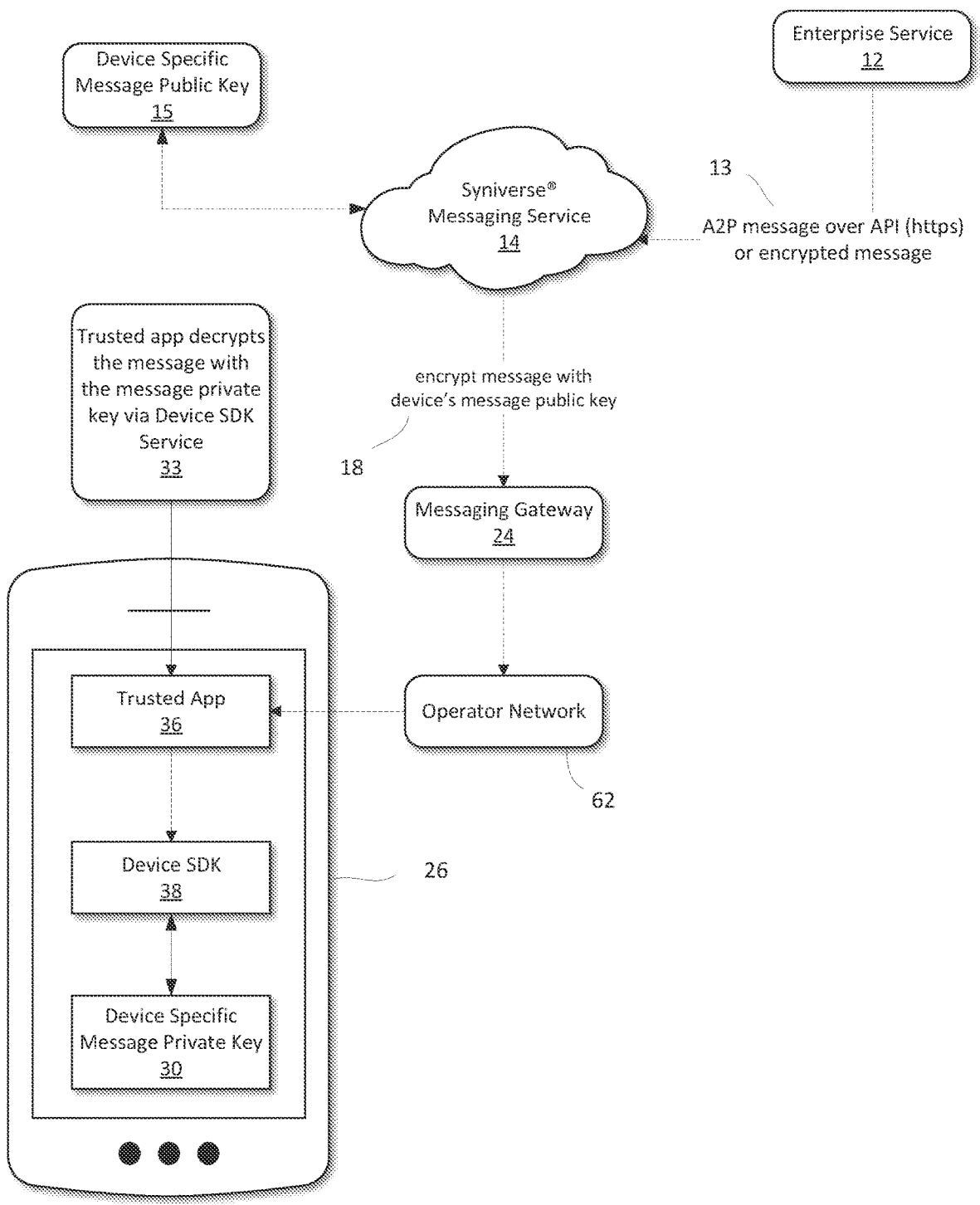
FIG. 4 is a diagrammatic view of an embodiment of the invention decrypting an message at a subscriber device originating from an enterprise application and encrypted prior through a messaging service coupled to the messaging gateway.

FIG. 4 shows an enterprise application 12 sending a message destined for the subscriber device 26. The message is initially sent securely (e.g., HTTPS) 13 to the cloud messaging service 14. The cloud messaging service 14 already has the public key 15 for the device 26 from the provisioning process enumerated above. Accordingly, the message is now encrypted with the public key 15 prior to sending it through the messaging gateway 24 to the operator network 62. The trusted application 36 on the device 26 communicates to the TEE 32 to decrypt the message using the device-specific private key 30. A hardware vendor-provided SDK 38 typically serves as the intermediary between the trusted application 36 and the secure TEE 32 holding the private key 30.

Figure 5:
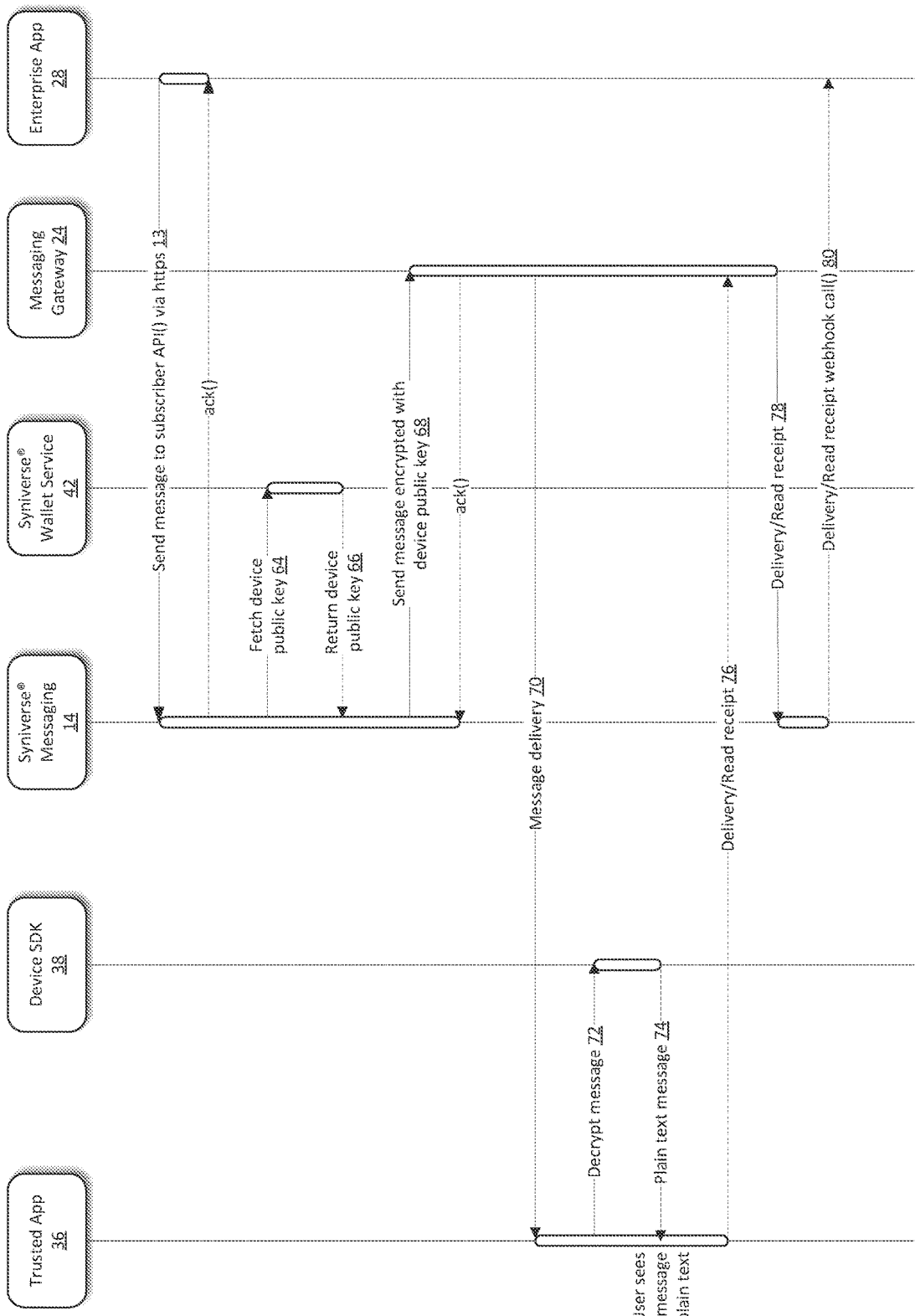
FIG. 5 is a call flow diagram of an embodiment of the invention for encrypting and decrypting a message originating at an enterprise application.

FIG. 5 shows the call flow of the encryption and decryption process of an already provisioned subscriber device 26. An enterprise application 28 sends a message 13 bound for subscriber. This is received by a cloud messaging service 14 that fetches 64 the public key 15 for the device 26 from a cloud wallet service 42. The message is then encrypted 68 with the public key 15 and sent to a messaging gateway 24 which acknowledges the transmission. From the messaging gateway 24, the encrypted message is delivered 70 to the trusted application 36 on the device 26 which uses the private key 30 to decrypt 72 the message as plain text 74 so it is now viewable to the end user of the device. A delivery/read receipt is transmitted 76 from the device to the messaging gateway 24 which is passed on from the cloud messaging service 14 back the enterprise application 28 that originated the message transmission.

It should be noted that SMS is just one message format going through an SS7 protocol gateway. Other formats may be employed such as MMS.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk, or the like.

Hardware equipment may be agnostic as to general computing or may be telecommunications-specific. Some exemplary equipment providers include, but are not limited to, those under the brands HUAWEI, CISCO SYSTEMS, NOKIA, and QUALCOMM.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C #, C++, Visual Basic or the like and conventional procedural programming languages, such as the "C" programming language or similar programming languages. Additional languages like ERLANG (or Open Telecom Platform, OTP) may be used or scripting languages such as PYTHON, LUA, and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Terms

Access Point Name (APN) refers to a gateway between a GSM, GPRS, 3G or 4G mobile network and another computer network, frequently the public Internet. The APN identifies the packet data network (PEN) that a mobile data user wants to communicate with. In addition to identifying a PDN, an APN may also be used to define the type of service.

Application Function (AF) is a logical element of the 3GPP policy and charging control (PCC) framework which provides session related information to the policy and charging rules function (PCRF) in support of PCC rule generation.

Application Programming Interface (API) means a set of rules and protocols for building and interacting with software applications. An API defines the ways in which different software components should interact and communicate with each other, essentially detailing the expected behavior of the systems in different circumstances.

Asymmetric Cryptography (public/private-key cryptography) means a process that uses a pair of related keys to encrypt (public) and decrypt (private) a message and protect it from unauthorized access or use.

Attestation means providing cryptographically signed evidence about the state of the device and its trustworthiness. Attestation of a mobile device identity using immutable identifying information in the Trusted Execution Environment (TEE) is a process of proving the authenticity and integrity of a mobile device's hardware, software, and identity. This process leverages the TEE, a secure and isolated environment within the mobile device's processor, to provide a high level of security and protection against tampering. Immutable identifying information refers to data that cannot be altered or changed after it is generated. In the context of device attestation, this information may include unique device identifiers, cryptographic keys, or hardware-based security features.

Attribute Value Pair (AVP) means an information element of a Diameter Protocol message. Each Diameter message will contain multiple AVPs, such as Destination-Host AVP, Subscription ID AVP, Server-Name AVP, Framed IP Address AVP and the like.

Cloud Messaging Service means a cloud-based platform that enables the sending and receiving of messages between applications, devices, and systems over the Internet. These messaging services may handle various types of messages, such as SMS (Short Message Service), MMS (Multimedia Messaging Service), push notifications, in-app messages, and email.

Diameter is an authentication, authorization, and accounting protocol for computer networks.

Diameter Routing Agent (DRA) is an element in a 3G or 4G (such as LTE) network that enables real-time routing capabilities so that messages are routed among the correct elements in a network. The DRA was launched by the 3GPP to address the increased Diameter signaling traffic and growing sophistication of 4G LTE networks.

Enterprise Service means an SMS messaging platform that businesses use to manage and execute their SMS campaigns. These platforms offer features such as contact list management, message templates, scheduling, and reporting. Some messaging platforms also provide APIs for integration with other business systems. They are used for several purposes that include, but are not limited to, marketing, notifications, alerts, customer support, internal communication, and two-factor authentication (2FA).

Evolved Node B (eNB or eNodeB) is a base station terminating the air interface on the network side. It is responsible for all radio resource management. It is also responsible for allocation of user traffic to the downlink/uplink, security, and relaying of higher layer NAS (Non-Access Stratum) signaling to the MME.

Evolved Universal Terrestrial Radio Access Network (EUTRAN) is the radio (air interface) access architecture for LTE.

Fully Qualified Domain Name (FQDN) is a domain name that specifies its exact location in the tree hierarchy of the Domain Name System (DNS).

Gateway Mobile Switching Center (GMSC) is a function within a PLMN (Public Land Mobile Network). GMSC terminates the PSTN (Public Switched Telephone Network) signaling and traffic formats. It converts this to protocols used in mobile networks. For mobile terminated calls, GMSC interacts with the HLR (Home Location Register) to retrieve routing information.

General Packet Radio Service (GPRS) is a packet oriented mobile data standard on the 2G and 3G cellular communication network's global system for mobile communications (GSM).

GPRS Tunneling Protocol (GTP) is defined by 3GPP standards to carry General Packet Radio Service (GPRS) within 3G/4G networks.

HLR means Home Location Register which is a database that contains subscription data about subscribers authorized to use the GSM core network. The HLRs store details of every SIM card issued by the mobile phone operator.

Home Public Land Mobile Network (HPLMN) means the network in which a mobile subscriber's profile is held. Mobile users that roam on other networks (visiting) receive subscription information from the HPLMN.

HSS means Home Subscriber Service which implements HLR and Diameter signaling. The HSS is a central database that contains user-related and subscription-related information. The functions of the HSS include functionalities such as mobility management, call and session establishment support, user authentication and access authorization. The HSS is used in IMS and 4G while HLR is used in 2G and 3G.

Hypertext Transfer Protocol (HTTP) Encryption means the process of securing the communication between a client (such as a web browser) and a server (such as a web server) when they exchange data using the HTTP (Hypertext Transfer Protocol) protocol. The primary goal of HTTP encryption is to protect sensitive information from being intercepted, tampered with, or read by unauthorized parties during transmission. The most widely-used method for encrypting HTTP communication is by implementing HTTPS (Hypertext Transfer Protocol Secure), which uses SSL (Secure Sockets Layer) or its successor TLS (Transport Layer Security) to encrypt the data transmitted between the client and the server. HTTPS is essentially the secure version of HTTP, providing end-to-end encryption, data integrity, and authentication.

IMS means IP Multimedia Subsystem, an architectural framework to standardize the delivery of voice and other multimedia services of IP packet-switched networks.

IMSI means International Mobile Subscriber Identity. It is a specification used to uniquely identify a subscriber to a mobile telephone service. It is used internally to a GSM network and is adopted on nearly all cellular networks. The IMSI is a 50-bit field which identifies the phone's home country and carrier and is usually fifteen digits. This 15-digit number has two parts. The first part is comprised of six digits in the North American standard and five digits in the European standard. It identifies the GSM network operator in a specific country where the subscriber holds an account. The second part is allocated by the network operator to uniquely identify the subscriber. For GSM, UMTS and LTE network, this number is provisioned in the SIM card and for CDMA2000 in the phone directly or in the R-UIM card (the CDMA2000 analogue to a SIM card for GSM).

Inbound Roaming means a subscriber of another network "visits" within the local (home) network but can use the local network to makes calls, send messages and the like. The inbound roaming service allows subscribers from other operators to access the local network and services.

Interconnect Border Control Function (IBCF) is a boundary control between various service provider networks, providing IMS network security in terms of signaling information. It enables communication between IPv4 and IPv6 SIP applications, controlling transport plane functions, network topology hiding, screening of SIP signaling, selecting an optimum signaling interconnect, and creation of charging data records.

Interrogating Call Session Control Function (I-CSCF) is responsible for onward routing of SIP messages to the appropriate S-CSCF (Serving CSCF) for a given subscriber. It is a key element in the IMS roaming methodology.

IP Short Message Gateway (IPSMGW) is an IMS application server handling SIP based messaging services for IMS subscribers.

Key Pair refers to a set of two related cryptographic keys that are used in asymmetric encryption, also known as public key cryptography. The key pair consists of: (1) a Public Key: This key is made publicly available and is used for encryption. Anyone can use this key to encrypt data or messages intended for the owner of the key pair. Once the data is encrypted using the public key, it can only be decrypted using the corresponding private key. (2) a Private Key: This key is kept secret and is only known to the owner of the key pair. It is used for decryption, allowing the owner to decrypt the data or messages that have been encrypted using their public key. The private key can also be used to digitally sign messages, providing a means of authentication and integrity.

Long-Term Evolution (LTE) is a standard for wireless broadband communication for mobile devices and data terminals, based on the GSM/EDGE and UMTS/HSPA technologies.

Media Gateway (MGW) handles the media plane (voice) in a distributed switch.

Media Gateway Control Function (MGCF) facilitates call control, interfacing the PS domain to the circuit switched domain when interworking between the IMS and PSTN is necessary.

Mobile application part (MAP) is an SS7 protocol used to access the home location register (HLR), visitor location register (VLR), mobile switching center and other components of a mobile network infrastructure.

Mobile Switching Center (MSC) means the primary service delivery node for GSM/CDMA, responsible for routing voice calls and SMS as well as other services. The MSC connects and releases end-to-end connections, administers mobility and hand-over requirements during the call and oversees charging and real-time prepaid account monitoring.

Mobility Management Entity (MME) is a component standardized within the long-term evolution (LTE) system. MME provides mobility session management for the LTE network and supports authentication, handovers and roaming between subscribers and other networks.

MSISDN means Mobile Station International Subscriber Directory Number which is provisioned to a mobile device subscriber for making calls. It is the mapping of the telephone number to the SIM card (or CDMA2000 directly in the hardware) in a mobile or cellular phone and is the number normally dialed to connect a call to the mobile device. A SIM card has a unique IMSI that does not change but the MSIDN can change in time (e.g., telephone number portability).

Multimedia Messaging Service (MMS) is a framework to send messages that include multimedia content to and from a mobile phone over a cellular network. The MMS standard extends the Short Message Service (SMS) capability. MMS allows the exchange of text messages greater than 160 characters in length.

Outbound Roaming typically occurs when a subscriber travels to another country. That subscriber's home network has an agreement with the network he is visiting in the other country. This agreement permits the subscriber to use his mobile phone to make calls and send messages on this visiting network. The subscriber is "outbound roaming" with respect to his home network providers. Concurrently, in the view of the visited network, this subscriber is "inbound roaming." In other words, the inbound roaming service allows subscribers from other operators to access the local network and services. The outbound roaming service allows subscribers from the local network to access another operator's network and services.

Packet Data Network Gateway (PGW) is used to allocate IP addresses to the user equipment during default bearer setup.

Policy and Charging Rules Function (PCRF) is the software node designated in real-time that supports service data flow detection, policy enforcement and flow-based charging.

Proxy Call Session Control Function (P-CSCF) is a SIP proxy that is the first point of contact for user equipment in a mobile network. All SIP traffic to and from the user equipment must go through the P-CSCF. It acts as the ingress and egress point to and from a service provider's IMS domain with respect to the IMS client.

Public Switched Telephone Network (PSTN) means a circuit switched network that is used primarily for voice communications worldwide.

Wireless OEM Edge Services enables service providers to manage devices that verify the device identity in addition to several other security-impacting characteristics.

Rich Communication Services (RCS) is a communication protocol that seeks to enhance and surpass traditional messaging systems, particularly SMS (Simple Messaging Service) and MMS (Multimedia Messaging Service). The protocol aims to facilitate a broad spectrum of communication services, integrating them seamlessly over IP-based networks. RCS is fundamentally characterized by its support for the transfer of high-fidelity multimedia content, a substantial improvement over traditional MMS capabilities. Its protocol specifications allow for the transmission of high-resolution images, videos, and other media types. Moreover, RCS includes advanced group messaging features. It supports group chat creation, message delivery notifications, and real-time user typing indicators, functionalities largely similar to those found in IP-based messaging applications. Another noteworthy aspect of the RCS protocol pertains to its "fallback" feature. This attribute allows messages to be sent as SMS or MMS when RCS is not available, either due to network issues or because the recipient's device does not support RCS. This ensures continuity and reliability of message delivery, a critical factor for a communication protocol. The architecture of RCS is designed to be flexible and interoperable, with the intent to work across different carriers and devices. Despite its significant advancements, the RCS protocol, at its core specification level, does not include end-to-end encryption, thus leaving the security measures largely to the implementation by service providers.

S6a Interface is Diameter interface between MME and HSS in the LTE network providing messages and procedures for phone attachment.

Serving Call Session Control Function (S-CSCF) is the primary node in the IMS handling session control. Subscribers are assigned a S-CSCF for the duration of their IMS registration to facilitate routing of SIP messages.

Serving Gateway (SGW) routes and forwards user data packets. The SGW manages and stores UE contexts, e.g., parameters of the IP bearer service, network internal routing information.

Serving GPRS Support Node (SGSN) is a main component of the GPRS network, which handles all packet switched data within the network.

Session Initiation Protocol (SIP) is a protocol designed to establish, maintain, and terminate multimedia sessions. SIP has been adopted as the main signaling protocol in different network architectures. This SIP is deployed in 3GPP IMS (IP Multimedia System).

Short Message Service (SMS) is a text message (e.g., string of characters) generally sent from one mobile device to another over the cellular network. SMS is a text-only standard formalized in 1985 in the Global System for Mobile Communications (GSM) standards.

Signal Transfer Point (STP) is a node in an SS7 network (2G and 3G) that routes signaling messages based on their destination point code in the SS7 network.

Signaling System No. 7 (SS7) means a telecommunications protocol defined by the International Telecommunication Union (ITU) to offload setup of phone calls onto a separate packet-switched network. SS7 is used for setting up and tearing down most of the world's public switched telephone network (PSTN) telephone calls. It also performs number translation, local number portability, prepaid billing, Short Message Service (SMS), and other mass market services.

Telephony application server (TAS) means a component used in the core network of a telecom network operator to provide telephony applications and additional multimedia functions. TAS provides the service logic for invoking the media servers to provide the call progress tones and announcements. If the calls originate or terminate on the PSTN, the TAS provides SIP signaling to the MGCF to instruct the media gateways to convert the PSTN TDM voice bit stream to an IP RTP stream and to direct it to the Internet protocol (IP) address of the corresponding IP phone.

Trusted execution environment (TEE) means a secure area of a main processor that ensures the confidentiality and integrity of the data and code executed within it. It isolates sensitive operations and data from the rest of the device's operating system, providing a higher level of security against potential threats and malicious attacks. An enterprise application in a Trusted Execution Environment is a software application designed to meet the specific needs of an organization while leveraging the security benefits of a TEE. These applications are developed to manage and process sensitive data, such as financial transactions, employee records, intellectual property, or other critical business information, while ensuring that the data remains secure and protected from unauthorized access or tampering. In a TEE, the enterprise application is executed within a separate, isolated environment from the main operating system. This separation helps to protect the application and its data from potential vulnerabilities in the operating system or other applications running on the device. The TEE also provides a secure environment for cryptographic operations, secure storage of sensitive data, and secure communications between different components of the enterprise system. Examples of enterprise applications that could benefit from a TEE include: (1) Mobile banking applications that require secure processing of financial transactions and protection of sensitive customer data; (2) healthcare applications that manage and store confidential patient information and need to comply with strict data privacy regulations; and (3) enterprise resource planning (ERP) systems that process sensitive business data and require protection from potential data breaches or unauthorized access.

Universal Mobile Telecommunications System (UMTS) Terrestrial Radio Access Network (UTRAN) means the radio technology used between mobile terminals and the base stations of 3G UMTS.

User Equipment (UE) means a mobile device connectable to a cellular telecommunications network.

Virtualized Mobility Management Entity (vMME) means a virtualized implementation of the main control plane entity of the network which maintains mobility state of user equipment in a network.

Visitor Location Register (VLR) means a database storing data about mobile phones that recently joined a particular area of a mobile operator's network. The VLR keeps track of roamed mobile phone subscribers and communications with the HLR to determine whether the mobile phone is a permanent or temporary subscriber.

Visited Public Land Mobile Network (VPLMN) means a network that a mobile subscriber roams on when leaving their Home Public Land Mobile Network (HPLMN).

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of provisioning message encryption for mobile communications, the method comprising the steps of:

providing a trusted application on subscriber device;

sending from the trusted application a device identity request to a wireless device software development kit (SDK) operating on the subscriber device, the SDK providing a device identity response to the trusted application from a trusted execution environment (TEE), the device identity response comprising an immutable, hardware device identity of the subscriber device only also known to an original equipment manufacturer (OEM) cloud service;

generating in the trusted application on the subscriber device a public key and private key;

saving the private key to a secure store in the subscriber device;

using the generated public key with the device identity to create an encrypted and signed blob wherein the public key of the subscriber device is encrypted with the device identity;

sending the blob to the cloud messaging application;

from the cloud messaging application, sending the blob to the OEM cloud service using the device identity of the subscriber device; and upon verifying the subscriber device is trustworthy by the OEM cloud service, decrypting the public key of the device and returning the decrypted public key to the cloud messaging application whereby messages addressed to the subscriber device and whose type is selected from the group consisting of Short Messaging Service (SMS), Multimedia Messaging Service (MMS) and Rich Communication Services (RCS) are encrypted with the public key now decrypted and accessible by the cloud messaging application, the messages received by the subscriber device decrypted with the private key resident on the subscriber device.

2. A method for end-to-end message encryption in mobile messaging, subsequent to a provisioning process including the generation and distribution of encryption keys, the method comprising:

a. receiving, at a cloud messaging service, a Hypertext Transfer Protocol Secure (HTTPS) message from an enterprise service, the message being intended for a subscriber device;

b. decrypting the HTTPS message at the cloud messaging service;

c. re-encrypting the message using a public key associated with the subscriber device, wherein the public key is previously provisioned and distributed to the cloud messaging service as part of the provisioning process that included verifying the subscriber device was trustworthy by an OEM cloud service by comparing an immutable device identity of the subscriber device with that known valid to the OEM cloud service;

d. transmitting the re-encrypted message from the cloud messaging service to a gateway via a peer-to-peer protocol selected from the group consisting of Short Messaging Service (SMS), Multimedia Messaging Service (MMS), and Rich Communication Services (RCS);

e. delivering the encrypted message from the gateway to the subscriber device; and f. decrypting the encrypted message at the subscriber device using a private key corresponding to the public key, wherein the private key is securely stored on the subscriber device as part of the provisioning process and displaying the decrypted message on the subscriber device.

3. The method of claim 2 wherein the HTTPS message comprises a one-time-password (OTP) generated by the enterprise service for user authentication.

4. The method of claim 2 wherein the message is delivered via Signaling System Number 7 (SS7) protocol.

5. The method of claim 3, wherein the enterprise application establishes a secure HTTPS connection to the cloud messaging application, and the OTP is encrypted by the cloud messaging application using the public key of the subscriber device.

6. The method of claim 2, further comprising the step of providing chat functionality for the subscriber device to respond to the enterprise application, wherein a second key pair is generated, with the public key stored on the service and the private key stored by the cloud messaging service.

* * * * *